US011753952B2

(12) United States Patent
Binek et al.

(10) Patent No.: US 11,753,952 B2
(45) Date of Patent: Sep. 12, 2023

(54) SUPPORT STRUCTURE FOR A TURBINE VANE OF A GAS TURBINE ENGINE

(71) Applicant: United Technologies Corporation, Farmington, CT (US)

(72) Inventors: Lawrence A. Binek, Glastonbury, CT (US); David W. Morganson, Marlborough, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 303 days.

(21) Appl. No.: 16/593,638

(22) Filed: Oct. 4, 2019

(65) Prior Publication Data

US 2021/0102704 A1    Apr. 8, 2021

(51) Int. Cl.
| | | |
|---|---|---|
| *F01D 9/02* | (2006.01) |
| *F01D 9/04* | (2006.01) |
| *F23R 3/00* | (2006.01) |
| *F23R 3/50* | (2006.01) |
| *B22F 10/40* | (2021.01) |
| *B22F 10/64* | (2021.01) |
| *B33Y 10/00* | (2015.01) |
| *B33Y 80/00* | (2015.01) |

(52) U.S. Cl.
CPC .............. *F01D 9/044* (2013.01); *B22F 10/40* (2021.01); *B22F 10/64* (2021.01); *F01D 9/023* (2013.01); *F01D 9/041* (2013.01); *F23R 3/002* (2013.01); *F23R 3/50* (2013.01); *B33Y 10/00* (2014.12); *B33Y 80/00* (2014.12); *F05D 2230/30* (2013.01); *F05D 2240/12* (2013.01); *F05D 2240/35* (2013.01); *F05D 2300/1723* (2013.01); *F23R 2900/00018* (2013.01)

(58) Field of Classification Search
CPC .... F23R 3/50; F23R 3/60; F23R 3/002; F23R 2900/00017; F23R 2900/00018; F01D 9/023; F01D 9/041
See application file for complete search history.

(56) References Cited

U.S. PATENT DOCUMENTS

| | | | | |
|---|---|---|---|---|
| 3,288,434 A | * | 11/1966 | Chaboseau | F01D 9/023 |
| | | | | 415/185 |
| 3,691,766 A | * | 9/1972 | Champion | F02C 7/264 |
| | | | | 60/746 |
| 4,574,451 A | * | 3/1986 | Smashey | F01D 5/187 |
| | | | | 29/423 |

(Continued)

FOREIGN PATENT DOCUMENTS

| | | |
|---|---|---|
| EP | 3086041 A1 | 10/2016 |
| EP | 3279435 A2 | 2/2018 |

(Continued)

OTHER PUBLICATIONS

Extended European Search Report for EP Application No. 20199945.5, dated Feb. 24, 2021, pp. 9.

*Primary Examiner* — Thomas P Burke
(74) *Attorney, Agent, or Firm* — Kinney & Lange, P. A.

(57) ABSTRACT

A method of manufacturing a turbine vane within an engine case includes additively manufacturing a combustor liner within an engine case, additively manufacturing a support structure attached to the combustor liner at a radially distal position, and additively manufacturing the turbine vane attached to the support structure at an inwardly adjacent position to the radially distal position.

12 Claims, 4 Drawing Sheets

(56) References Cited

U.S. PATENT DOCUMENTS

| | | | |
|---|---|---|---|
| 7,836,702 B2* | 11/2010 | Grivas | F01D 11/005 |
| | | | 60/788 |
| 9,238,969 B2* | 1/2016 | Batt | F01D 9/041 |
| 10,005,239 B2 | 6/2018 | Versluys et al. | |
| 11,466,593 B2* | 10/2022 | Binek | B22F 10/25 |
| 2001/0001897 A1* | 5/2001 | Zhao | F01D 25/12 |
| | | | 29/889 |
| 2007/0099013 A1* | 5/2007 | Rowe | C23C 28/042 |
| | | | 427/372.2 |
| 2009/0214331 A1 | 8/2009 | Jewess et al. | |
| 2010/0180597 A1* | 7/2010 | Kraemer | B01J 21/10 |
| | | | 60/737 |
| 2016/0195275 A1* | 7/2016 | Lyons | F23R 3/04 |
| | | | 60/722 |
| 2017/0343011 A1* | 11/2017 | Schwarz | F04D 29/544 |
| 2018/0171873 A1 | 6/2018 | Purcell et al. | |
| 2019/0086081 A1 | 3/2019 | Bellardi | |

FOREIGN PATENT DOCUMENTS

| | | | | |
|---|---|---|---|---|
| EP | 3467257 A1 | 4/2019 | | |
| GB | 2571802 A | 9/2019 | | |
| WO | WO-2018144064 A1 * | 8/2018 | | F23R 3/002 |
| WO | WO2018144064 A1 | 8/2018 | | |

* cited by examiner

SUPPORT STRUCTURE FOR A TURBINE VANE OF A GAS TURBINE ENGINE

BACKGROUND

The present disclosure relates generally to attritable aircraft engines. More specifically, this disclosure relates to a turbine support structure within an attritable aircraft engine.

Attritable aircraft can include, for example, Unpiloted (or Unmanned) Aerial Vehicles (UAVs) and expendable turbojet systems for guided munitions, missiles, and decoys. Attritable aircraft are generally designed as a limited lifetime vehicle, which can be as short as a single use or single mission vehicle. As such, many components and features common in traditional piloted aircraft are unnecessary or can be simplified for attritable aircraft applications.

For example, a turbine vane within an attritable aircraft should account for thermal expansion under working conditions. As turbine vanes are exposed to the hot gases of the combustion chamber, the turbine vanes expand as they heat up. The turbine vanes are generally attached to adjacent structures within the turbine and can stress the adjacent structures if the turbine vanes are not allowed to freely thermally expand. Stressing the adjacent structures can cause cracks to form in the adjacent structures, leading to failure of the engine. However, manufacturing and assembly of individual turbine vanes, which account for thermal expansion, can be expensive and time consuming.

SUMMARY

A method of manufacturing a turbine vane within an engine case includes additively manufacturing a combustor liner within an engine case, additively manufacturing a support structure attached to the combustor liner at a radially distal position, and additively manufacturing the turbine vane attached to the support structure at an inwardly adjacent position to the radially distal position.

A gas turbine engine includes a combustor liner and a support structure integrally attached to the combustor liner at a radially distal position. The engine also includes a turbine vane integrally attached to the support structure at an inwardly adjacent position to the radially distal position.

DETAILED DESCRIPTION

An attritable engine with an integrally built turbine vane simplifies manufacturing. Even so, an attritable engine can leverage additive manufacturing techniques to improve various aspects of the limited-life engine. For example, additive manufacturing allows the assembly details to be unitized and, simultaneously permits integration of many complex performance-enhancing features. The additively manufactured engine reduces the time to delivery to the customer and lowers the overall production costs of the unit.

Disclosed herein is an integrally built turbine vane within an attritable engine. The turbine vane includes a support structure, which facilitates construction of the turbine vane during the additive manufacturing process. The support structure can be removed after the turbine vane has been built and results in a gap between a distal end of the turbine vane and an adjacent structure. The gap allows the turbine vane to thermally expand under load as the turbine vane is exposed to the hot gases exiting the combustor. If the turbine vane were not allowed to freely thermally expand by constraining the turbine vane on both a proximal and distal end, pressure would build up at the sites of attachment on adjacent structures. The pressure build up can result in cracks forming in the adjacent structures, leading to failure of the attritable engine.

Figure 1:
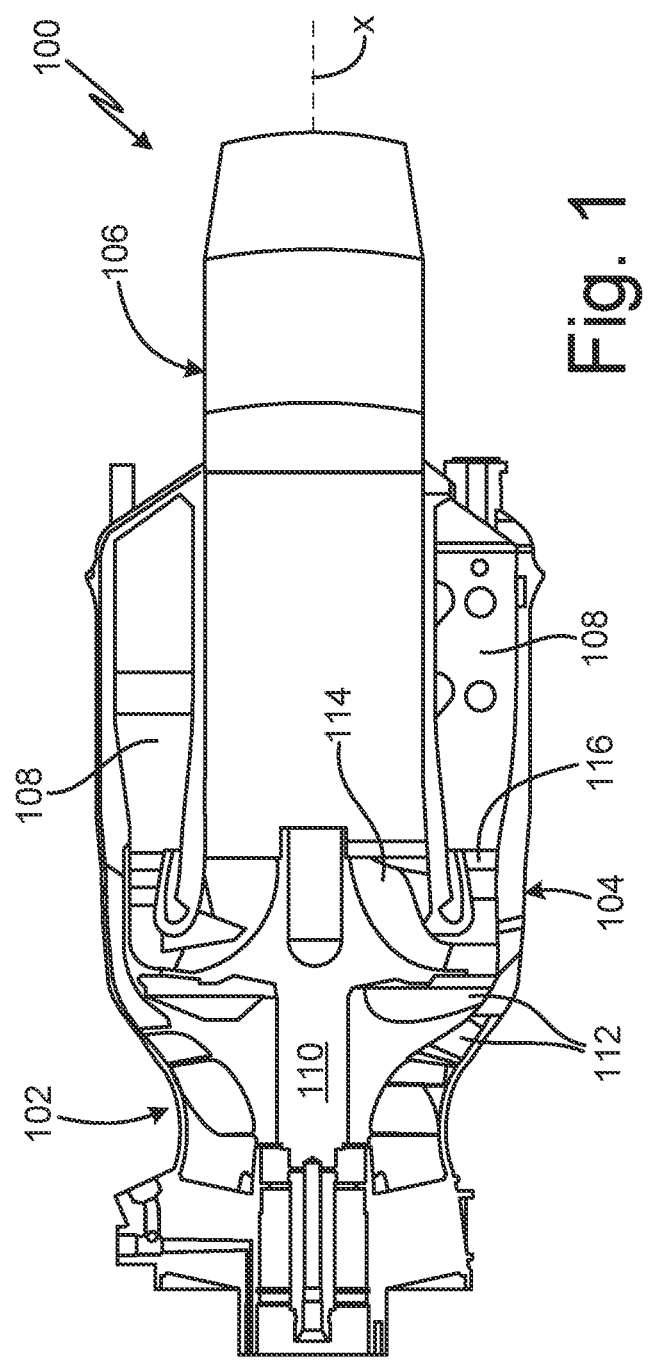
FIG. 1 is a cross-sectional view of an attritable engine.

FIG. 1 is a cross-sectional view of an attritable engine. FIG. 1 shows attritable engine 100 including compressor section 102, turbine section 104, exhaust section 106, combustor 108, rotor 110, compressor blades 112, turbine blades 114, turbine vanes 116, and axis of rotation X. In the illustrated embodiment, attritable engine 100 shows compressor section 102 lying forward and adjacent to turbine section 104, which is positioned forward of exhaust section 106. Although combustor 108 lies physically aft of turbine section 104, combustor 108 fluidically sits between compressor section 102 and turbine section 104. This arrangement may be referred to as a reverse flow combustor. Rotor 110 extends along the axis of rotation X into both compressor section 102 and turbine section 104. Attached to rotor 110 are compressor blades 112 and turbine blades 114.

Operationally, air enters the forward end of compressor section 102 and is compressed by compressor blades 112. Compressed air along with fuel enters combustor 108 where the compressed air and fuel are combusted. The combusted fuel and compressed air from combustor 108 enter turbine section 104, where the combusted fuel and compressed air are directed by turbine vanes 116 and turn turbine blades 114 circumferentially around rotational axis X, which generates power by also turning rotor 110. The air exits out of the aft end of exhaust section 106.

Attritable engine 100 can be additively manufactured using techniques such as laser powder bed fusion, electron beam melting, and binder jetting. The additive manufacturing process can use any metal or alloy that can tolerate the high temperature and pressure environment of a gas turbine engine for the expected useable life of the vehicle, such as, for example, nickel based alloys like Inconel® 625, copper, and ceramic based materials. However, guided munitions, missiles, and decoys are designed as single use vehicles and can have a maximum useable life of 10 hours. Heat protection that extends the useable life of the vehicle beyond 10 hours can unnecessarily add labor and expense to the manufacturing of such an engine. On the other hand, some UAVs can be designed to perform multiple missions and more heat protection may be desirable. A specific metal or alloy with or without additional treatments to provide heat protection can be chosen with such considerations in mind. For example, a thermal barrier layer or coating can be applied to the metal or alloy to extend the useful life of the attritable engine.

Figure 2:
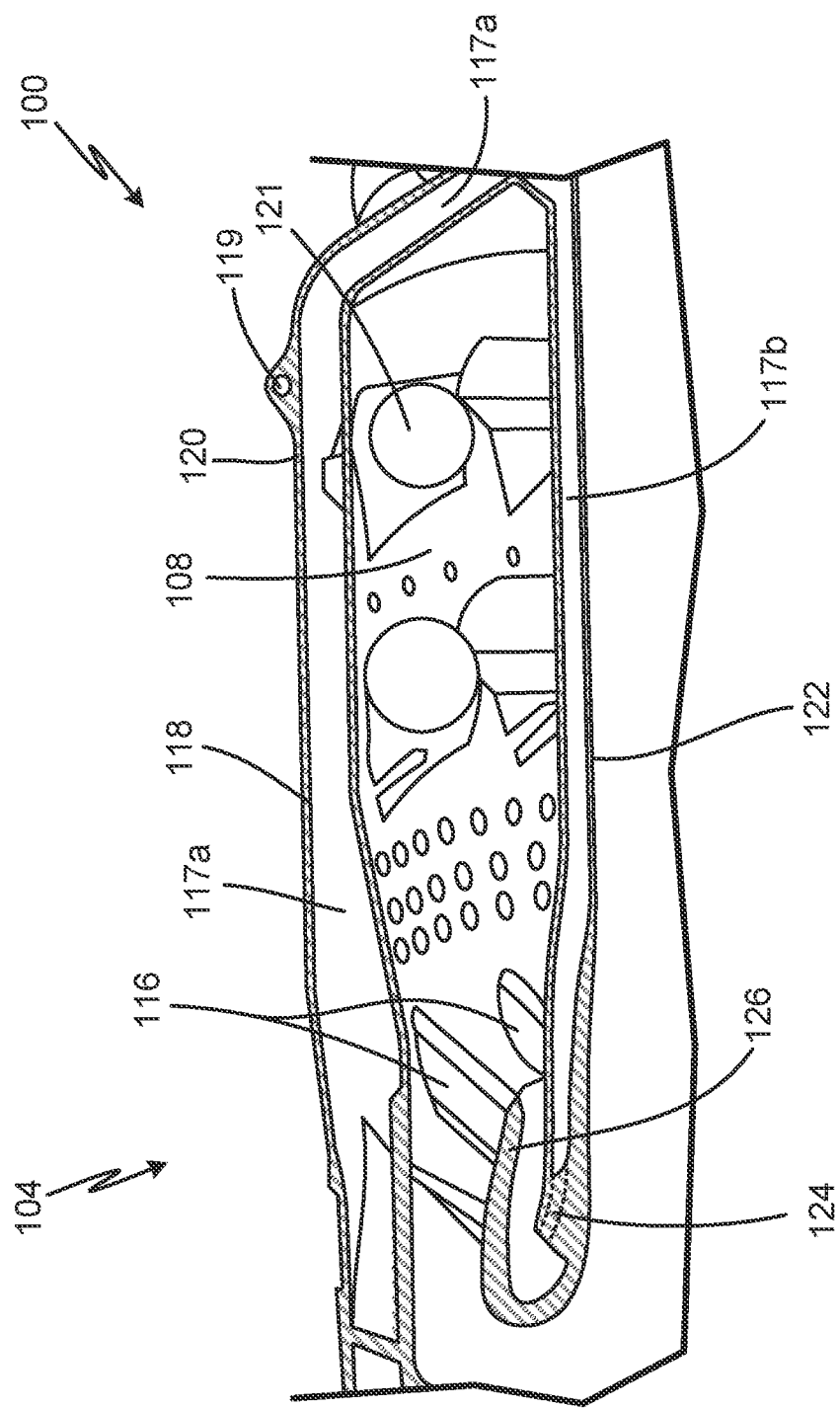
FIG. 2 is a cross-sectional view of an attritable engine including a combustor.

FIG. 2 is a cross-sectional view of an attritable engine including a combustor. FIG. 2 shows attritable engine 100 including turbine section 104, combustor 108, turbine vanes 116, chambers 117a and 117b, combustor liner 118, fuel line 119, engine casing wall 120, dilution holes 121, exhaust duct wall 122, aperture 124, and diffuser wall 126. Chamber 117a is a passageway for compressor air exiting from the compressor section and is defined by combustor liner 118 and casing wall 120. As the compressor air travels through chamber 117a, the compressor air makes a first turn within chamber 117a. The compressor air makes a second turn and enters chamber 117b, which is defined by combustor liner 118 and exhaust duct wall 122.

The compressor air travels through aperture 124 (obscured by exhaust duct wall 122 in FIG. 2) and exits a diffuser chamber, defined by combustor liner 118 and diffuser wall 126, and enters combustor 108. The compressor air travelling around combustor 108 through chambers 117a and 117b can cool combustor liner 118 under load. The compressor air entering combustor 108 from the diffuser chamber can cool the hot gases leaving combustor 108. Nonetheless, the hot gases encounter turbine vanes 116 as the hot gases enter the turbine section and can cause turbine vanes 116 to thermally expand. Turbine vanes 116 are forwardly attached to diffuser wall 126 and distally attached to combustor liner 118 and extend there between. The terms forward and distal refer to the radial distances of the sites of attached relative to axis of rotation X.

Additionally, the site of attachment of turbine vane 116 to combustor liner 118 can be relatively cool compared to the site of attachment of turbine vane 116 to diffuser wall 126. Combustor liner 118 near the site of attachment of turbine vane 116 is cooled by the relatively cool air from the compressed air exiting out of compressor section 102. The compressed air heats up as the compressed air travels through chambers 117a and 117b. Although the compressed air exiting the diffusion chamber is hotter than the compressed air exiting compressor section 102, the compressed air is cooler than the hot gases in combustor 108. This thermal mismatch between the sites of attachment of turbine vane 116 to combustor liner 118 and to diffuser wall 126 causes them to expand at different rates and by different amounts. A rigidly attached turbine vane 116 can cause structural stress at the sites of attachment to combustor liner 118 and diffuser wall 126, leading to cracks and fissures. Hot gases from combustor 108 can leak through any cracks or fissures that are formed, heating compressor air in chambers 117a and 117b. As such, the hotter compressed air relative to the compressed air without hot gas contamination from combustor 108 may be unable to provide sufficient cooling to combustor liner 118 or to the hot combustion gases as they encounter turbine vanes 116, leading to failure of the engine.

Figure 3:
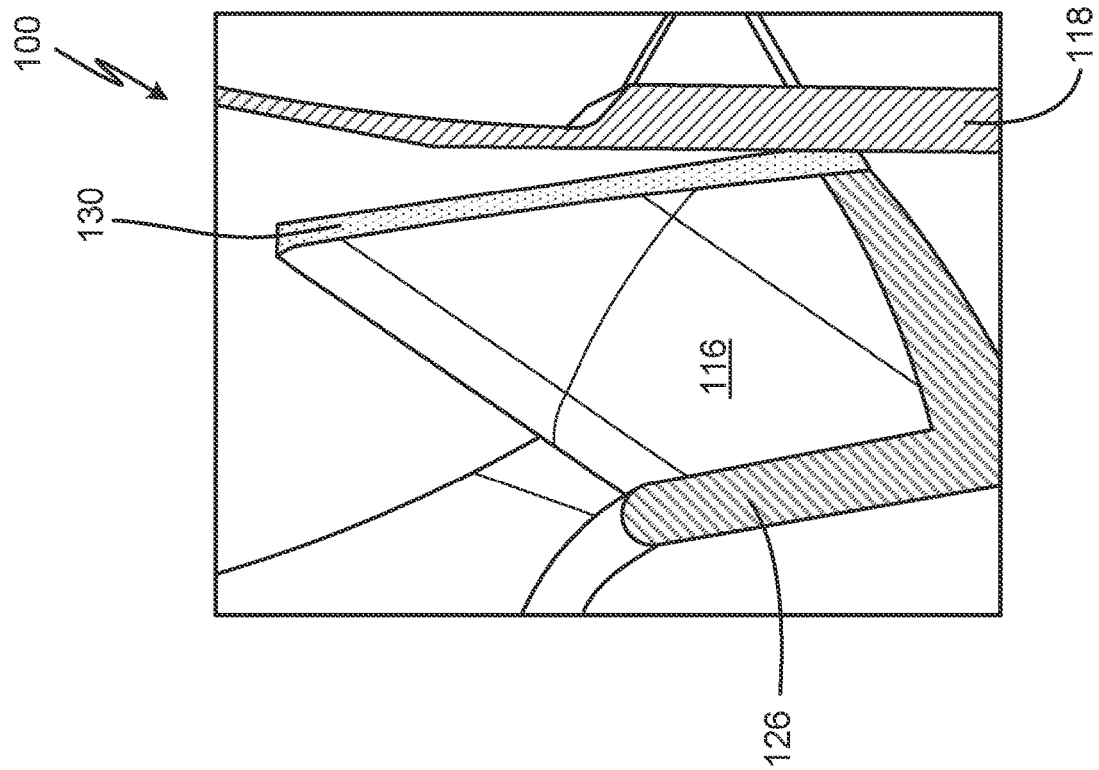
FIG. 3 is a cross-sectional view of an attritable engine including a support structure.

FIG. 3 is a cross-sectional view of an attritable engine including a support structure. FIG. 3 shows attritable engine 100 including turbine vane 116, combustor liner 118, diffuser wall 126, and support structure 130. Turbine vane 116 is forwardly attached to diffuser wall 126 in a radial direction relative to axis of rotation X. Turbine vane 116 extends in a radial direction away from axis of rotation X and is distally attached to support structure 130, which is attached to combustor liner 118. Support structure 130 and turbine vane 116 are integrally built with combustor liner 118 and diffuser wall 126. Support structure 130 enables turbine vane 116 to be integrally built using additive manufacturing techniques.

Furthermore, structures and features within an attritable engine must meet stringent tolerance requirements in order to operate within specifications. In order to meet the tolerance requirements, structures need to be supported during the additive manufacturing process. Unsupported or inadequately supported structures may not build properly.

Figure 4:
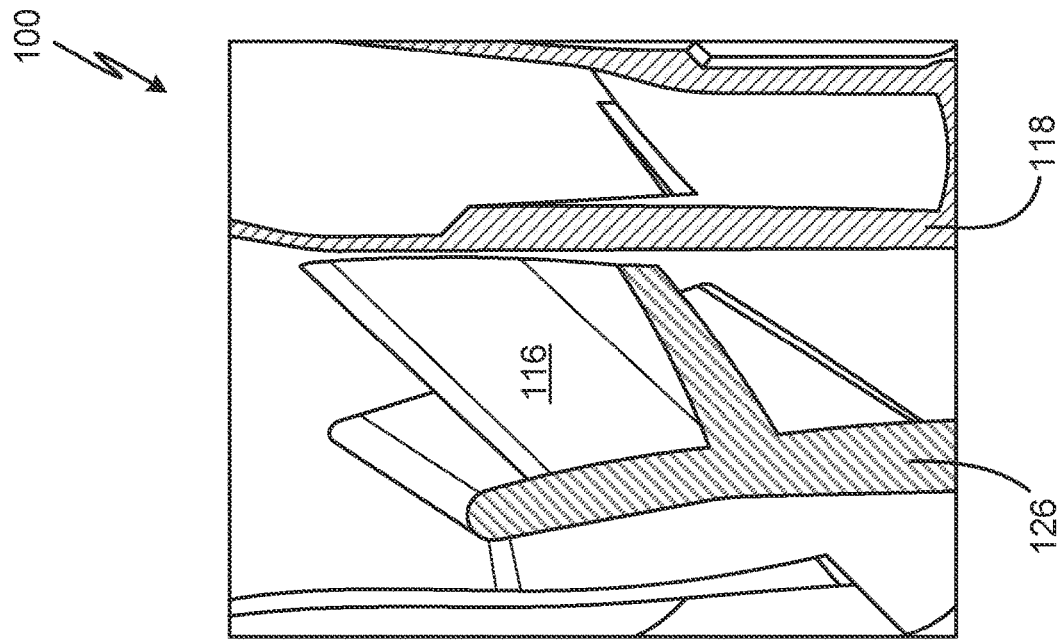
FIG. 4 is a cross-sectional view of an attritable engine with the support structure removed.

FIG. 4 is a cross-sectional view of an attritable engine with the support structure removed. FIG. 4 shows attritable engine 100 including turbine vane 116, combustor liner 118, and diffuser wall 126. Support structure 130 has been removed from attritable engine 100, leaving behind a gap between turbine vane 116 and combustor liner 118.

On the one hand, support structure 130 provides enough support to enable turbine vane 116 to be built using additive manufacturing techniques. On the other hand, support structure is configured to be removed without damaging any adjacent structures within the attritable engine. As such, support structure 130 is less dense than turbine vane 116, combustor liner 118, and diffuser wall 126. For example, support structure 130 can be removed by a thermal treatment. Attritable engine 100 can undergo a test fire and support structure 130 is exposed to hot combustion gasses. The hot combustion gasses thermally degrade support structure 130, leaving a gap between the distal end of turbine vane 116 and combustor liner 118. The gap allows turbine vane 116 to thermally expand when exposed to hot combustion gasses without mechanically stressing adjacent structures. For example, in one embodiment, the gap is 0.045 in. (1.1 mm) when the engine is cold and the gap is 0.020 in. (0.5 mm) when the engine is hot.

Although substantially all of support structure 130 is removed during the thermal treatment, some amount of support structure 130 can be left behind on either combustor liner 118, turbine vane 116, or both. The remaining pieces of support structure 130 can be, for example, ridges, bumps, and peaks. Additionally, as support structure 130 is removed the fragments can attach to structures downstream of turbine vane 116 such as, for example, the turbine blades and the exhaust duct wall, resulting in, for example, ridges, bumps, and peaks on those surfaces.

Support Structure 130 can be formed of a repeating network of spar assemblies. The repeating network gives enough support to allow turbine vane 116 to be built using additive manufacturing techniques. However, the repeating network is configured to be removed without damage to adjacent or downstream structures within the attritable engine. One embodiment of a spar assembly is illustrated in FIG. 5.

Figure 5:
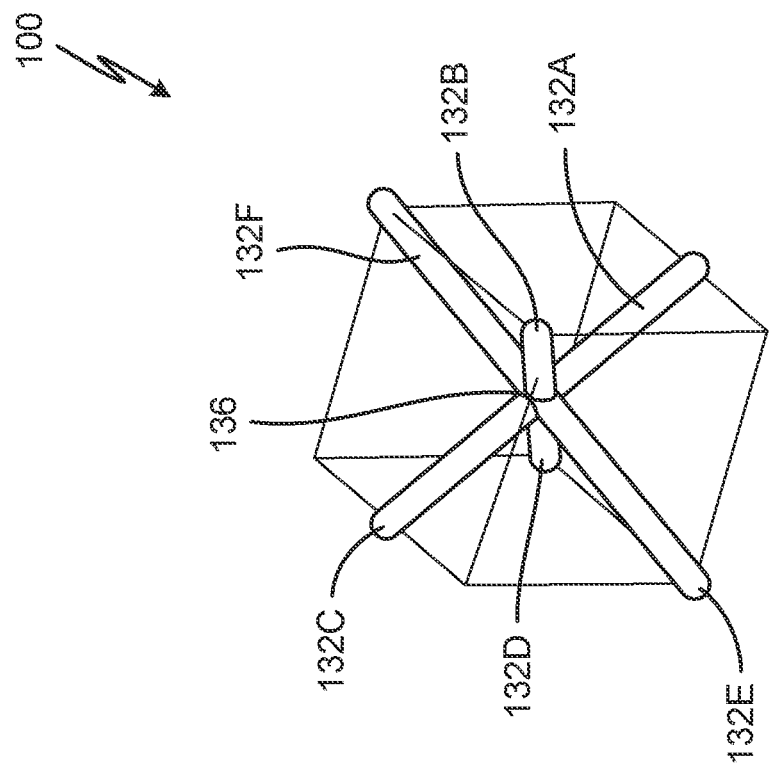
FIG. 5 is a perspective view of one embodiment of a repeating spar assembly.

FIG. 5 is a perspective view of one embodiment of a repeating spar assembly. FIG. 5 shows spar assembly 138 including spars 132A, 132B, 132C, 132D, 132E, and 132F, and center point 136. In the illustrated embodiment, there are six spars 132 radially extending from a center point 136. Adjacent spars 132, for example spars 132A and 132B, lie at substantially 90° angles to one another. The ends of any three adjacent spars 132, for example spars 132A, 132B, and 132E, which are at an opposing end to center point 136, can form an abstract triangle. Taking all eight sets of three adjacent spars 132 and the resulting abstract triangle from each set of three adjacent spars 132 forms an abstract 3-dimensional shape, which can referred to as a square bipyramid.

Each spar 132 can have, for example, a diameter of 0.01 inches (0.25 mm). In other embodiments, each spar 132 can have a diameter from 0.005 inches (0.13 mm) to 0.02 inches (0.51 mm), inclusive. In other embodiments, each spar 132 can have a diameter smaller than 0.005 inches (0.13 mm). In other embodiments, each spar 132 can have a diameter larger than 0.02 inches (0.51 mm). Each spar 132 can have a length of 0.05 inches (1.3 mm). In other embodiments, each spar 132 can have a length from 0.03 inches (0.76 mm) to 0.1 inches (2.5 mm), inclusive. In other embodiments, each spar 132 can have a length smaller than 0.03 inches (0.76 mm). In other embodiments, each spar 132 can have a length larger than 0.1 inches (2.5 mm).

In other embodiments, spar assembly 138 includes more than six spars 132. In other embodiments, spar assembly 138 includes fewer than six spars 132. In other embodiments, two adjacent spars 132 can lie at an angle more than 90° from one another. In other embodiments, two adjacent spars 132 can lie at an angle from 45° to 90° from one another.

Discussion of Possible Embodiments

The following are non-exclusive descriptions of possible embodiments of the present invention.

A method of manufacturing a turbine vane within an engine case includes additively manufacturing a combustor liner within an engine case, additively manufacturing a support structure attached to the combustor liner at a radially distal position, and additively manufacturing the turbine vane attached to the support structure at an inwardly adjacent position to the radially distal position.

The method of the preceding paragraph can optionally include, additionally and/or alternatively, any one or more of the following features, configurations and/or additional components:

The method includes removing the support structure.

Removing the support structure is by a thermal process.

The thermal process occurs during an initial start-up of the engine.

The turbine vane is configured to thermally grow within the engine case.

The turbine vane or the combustor liner includes bumps, ridges, or peaks from incomplete removal of the support structure.

The method of claim 3, wherein a turbine blade or an exhaust duct wall includes bumps, ridges, or peaks formed of fragments of the support structure, which are removed from the thermal expansion gap and attached to the turbine blade or the exhaust duct wall during a thermal process.

A gas turbine engine includes a combustor liner and a support structure integrally attached to the combustor liner at a radially distal position. The engine also includes a turbine vane integrally attached to the support structure at an inwardly adjacent position to the radially distal position.

The gas turbine engine of the preceding paragraph can optionally include, additionally and/or alternatively, any one or more of the following features, configurations and/or additional components:

The combustor liner, the support structure, and the turbine vane are formed of nickel or a nickel alloy.

The support structure is formed of a repeating network of spar assemblies.

Each spar assembly has a square bipyramid shape.

Each spar has a diameter from 0.005 inches (0.13 mm) to 0.02 inches (0.51 mm), inclusive.

Each spar has a length from 0.03 inches (0.76 mm) to 0.1 inches (2.5 mm), inclusive.

A gas turbine engine includes a combustor liner, a turbine vane, and a thermal expansion gap between the turbine vane and the combustor liner.

The gas turbine engine of the preceding paragraph can optionally include, additionally and/or alternatively, any one or more of the following features, configurations and/or additional components:

The turbine vane or the combustor liner includes bumps, ridges, or peaks from incomplete removal of a support structure.

A turbine blade or an exhaust duct wall includes bumps, ridges, or peaks formed of fragments of the support structure, which are removed from the thermal expansion gap and attached to the turbine blade or the exhaust duct wall during a thermal process.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of manufacturing a turbine vane within an engine case of a gas turbine engine, the method comprising:
   additively manufacturing a combustor liner within the engine case;
   additively manufacturing a support structure attached to the combustor liner at a radially distal position; and
   additively manufacturing the turbine vane attached to the support structure at an inwardly adjacent position to the radially distal position, wherein the support structure is formed of a repeating network of spar assemblies;
   additively manufacturing a diffuser wall such that the turbine vane is attached to the diffuser wall at a radially proximal position;
   wherein the combustor liner and turbine vane are formed of a metal or alloy that can tolerate the high temperature and pressure environment of the gas turbine engine and the support structure formed of the same metal or alloy as the turbine vane and combustor liner is less dense than the turbine vane and combustor liner such that the support structure is configured to be removed without damaging the turbine vane and combustor liner such that when the support structure is removed the turbine vane remains attached to the diffuser wall and a thermal expansion gap is formed between the turbine vane and the combustor liner.

2. The method of claim 1, further comprising removing the support structure.

3. The method of claim 2, wherein removing the support structure is by a thermal process.

4. The method of claim 3, wherein the thermal process occurs during an initial start-up of the engine.

5. The method of claim 2, wherein the turbine vane is configured to thermally grow within the engine case.

6. The method of claim 2, wherein the turbine vane or the combustor liner includes bumps, ridges, or peaks from incomplete removal of the support structure.

7. The method of claim 3, wherein a turbine blade or an exhaust duct wall includes bumps, ridges, or peaks formed of fragments of the support structure, which are removed from the thermal expansion gap and attached to the turbine blade or the exhaust duct wall during the thermal process.

8. A gas turbine engine comprising:
   a diffuser wall;
   a combustor liner;
   a support structure integrally attached to the combustor liner at a radially distal position; and
   a turbine vane integrally attached to the support structure at an inwardly adjacent position to the radially distal position, wherein the turbine vane is attached to the diffuser wall at a radially proximal position and the support structure is formed of a repeating network of spar assemblies;

wherein the combustor liner and turbine vane are formed of a metal or alloy that can tolerate the high temperature and pressure environment of the gas turbine engine and the support structure formed of the same metal or alloy as the turbine vane and combustor liner is less dense than the turbine vane and combustor liner such that the support structure is configured to be removed without damaging the turbine vane and combustor liner such that when the support structure is removed the turbine vane remains attached to the diffuser wall and a thermal expansion gap is formed between the turbine vane and the combustor liner.

9. The gas turbine engine of claim 8, wherein the combustor liner, the support structure, and the turbine vane are formed of nickel or a nickel alloy.

10. The gas turbine engine of claim 8, wherein each spar assembly has a square bipyramid shape.

11. The gas turbine engine of claim 8, wherein each spar ha from 0.005 inches (0.13 mm) to 0.02 inches (0.51 mm), incluss a diameterive.

12. The gas turbine engine of claim 8, wherein each spar has a length from 0.03 inches (0.76 mm) to 0.1 inches (2.5 mm), inclusive.

* * * * *